No. 877,304. PATENTED JAN. 21, 1908.
J. DICK.
SILAGE DISTRIBUTER.
APPLICATION FILED JUNE 24, 1907.

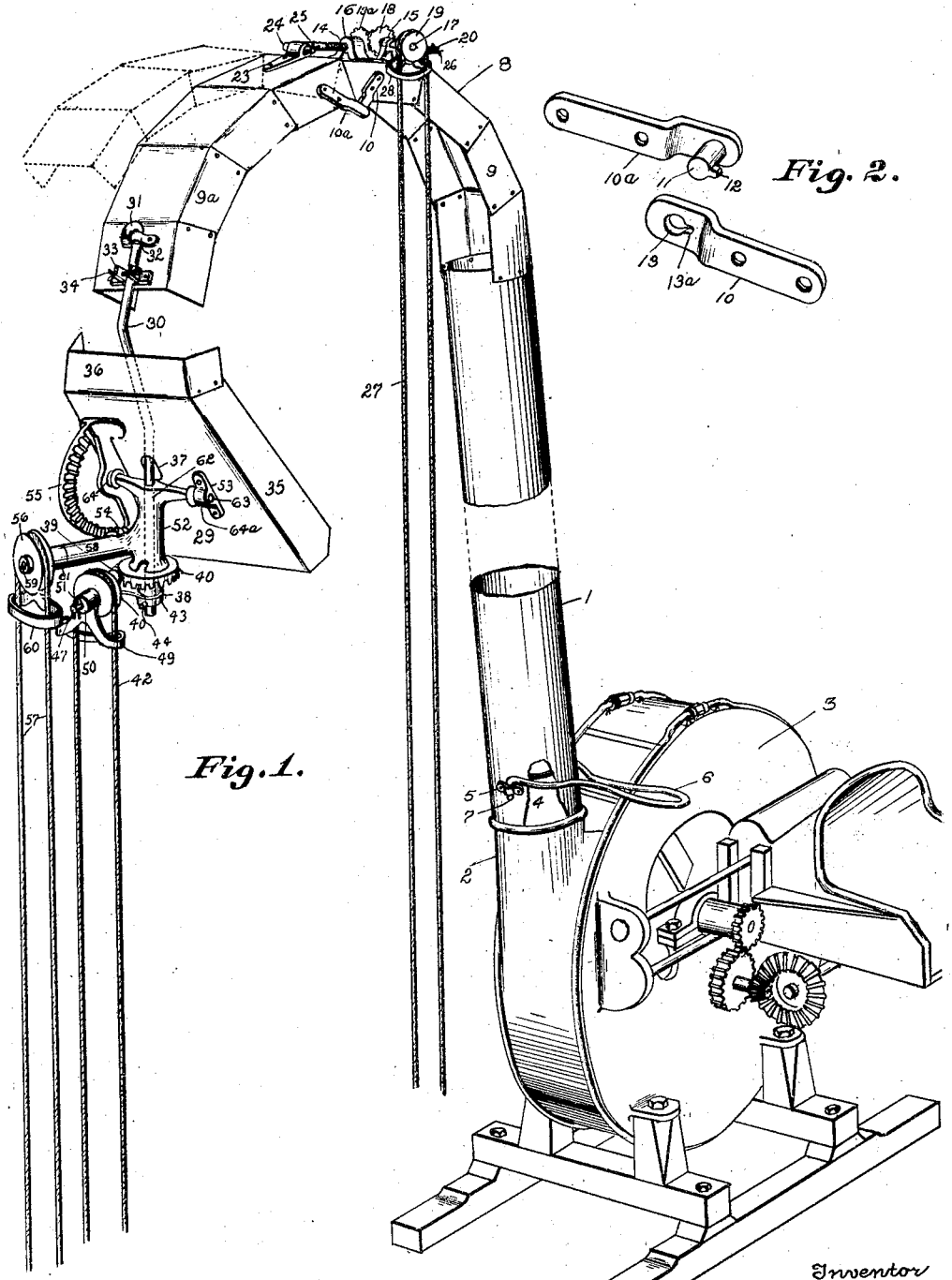

3 SHEETS—SHEET 2.

Witnesses
Harry O. Rastetter
Mary A. Cavanaugh

Inventor
Joseph Dick
By Harry Frease
Attorney

No. 877,304.

PATENTED JAN. 21, 1908.

J. DICK.
SILAGE DISTRIBUTER.
APPLICATION FILED JUNE 24, 1907.

3 SHEETS—SHEET 3.

Witnesses
Harry O. Rastetter
Mary A. Cavanaugh

Inventor
Joseph Dick
By Harry Frease
Attorney

UNITED STATES PATENT OFFICE.

JOSEPH DICK, OF CANTON, OHIO.

SILAGE-DISTRIBUTER.

No. 877,304.

Specification of Letters Patent.

Patented Jan. 21, 1908.

Application filed June 24, 1907. Serial No. 380,410.

*To all whom it may concern:*

Be it known that I, JOSEPH DICK, a citizen of the United States, residing at Canton, in the county of Stark and State of Ohio, have invented a new and useful Silage-Distributer, of which the following is a specification.

My invention relates to improvements applied to the pipe leading from a pneumatic blower by means of which silage is elevated from a fodder cutter and discharged into the upper part of a silo; and the objects of the improvement are to provide means for rotating the main pipe as a whole on its axis, for adjusting the hinged discharge or deflecting end of the pipe, and for distributing the silage discharged from the pipe to any desired part of the silo. These general objects and other minor advantages are attained by the construction, mechanism and arrangement illustrated in the accompanying drawings, in which—

Figure 3:
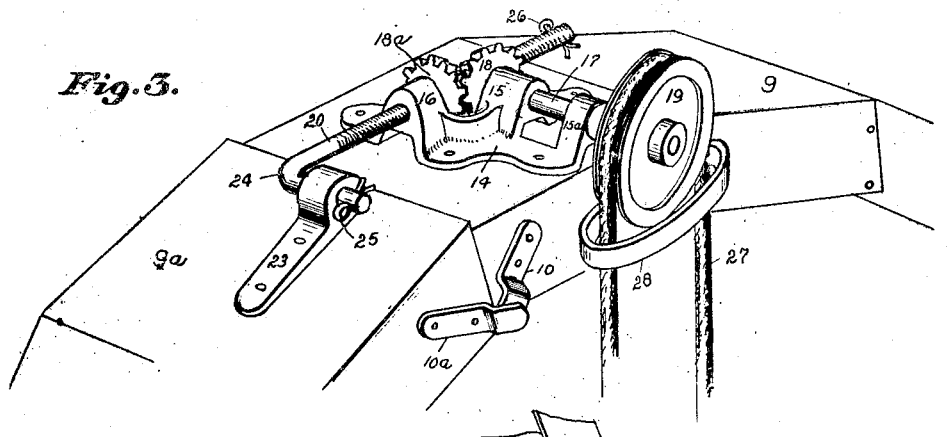
Figure 4:
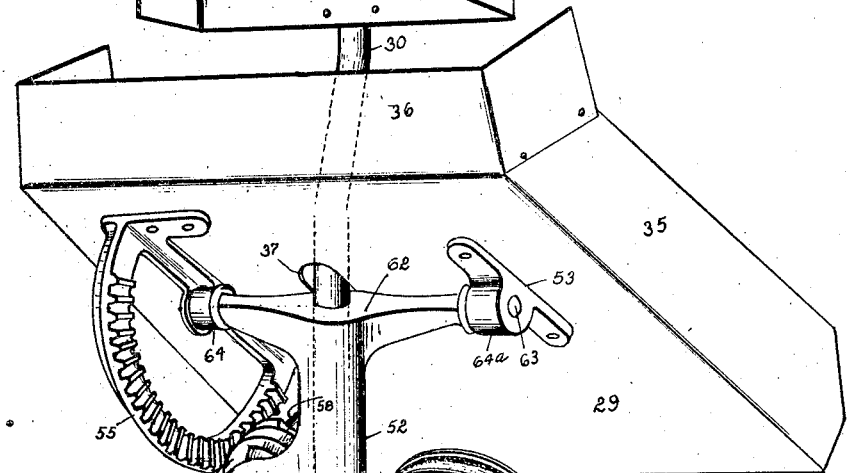
Figure 5:
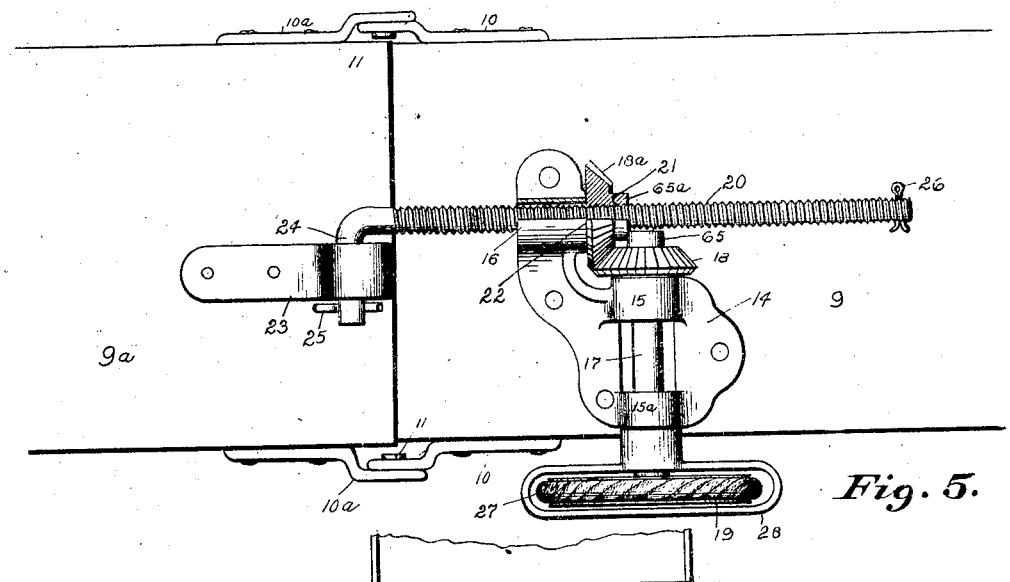
Figure 6:
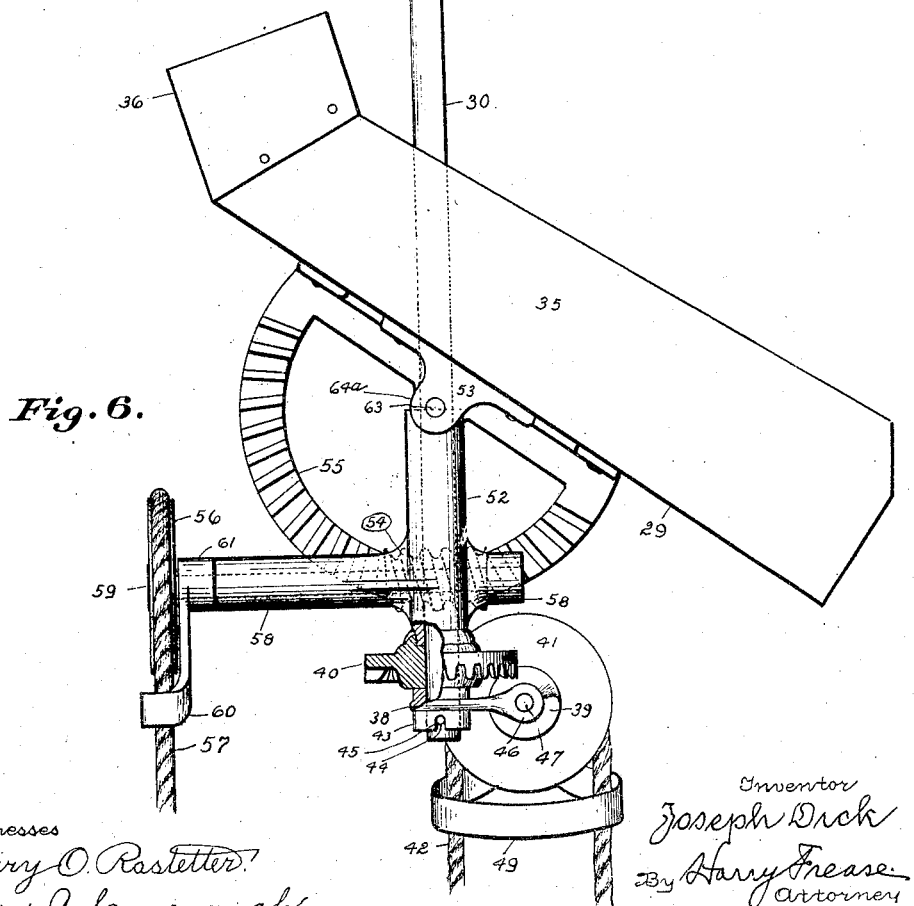

Figure 1 is a perspective view of a fodder cutter blower and its elevator pipe showing the improvements applied thereto; Fig. 2, a detached perspective view of the two members of the hinge for the deflector end of the pipe; Fig. 3, a fragmentary perspective view of the adjusting mechanism for the hinged deflector end of the pipe; Fig. 4, a perspective view of the distributing chute and its operating mechanism, showing the same rotated in reverse position from that shown in Fig. 1.; Fig. 5, a plan view partly in section, showing details of the deflector adjusting mechanism; and Fig. 6, a fragmentary side elevation, partly in section, showing the distributing chute and its mechanism rotated to a quarter position between the position shown in Figs. 1 and 4.

Similar numerals refer to similar parts throughout the drawings.

The lower end of the elevator pipe 1 telescopes over the outlet tube 2 of the pneumatic blower 3, and is adapted to rotate on the annular flange or collar 4 which is formed or attached on the outlet tube of the blower, or'attached to its end, which flange forms a support for the pipe. Loops or eyes 5 are provided on opposite sides of the pipe, preferably at or near its lower end, and the pipe is rotated on its axis by the bifurcated wrench 6 having hooks or fingers, as 7, adapted to be entered in the eyes on opposite sides of the pipe.

The semi-circular deflector 8, preferably made in two sections 9 and 9ª, as shown, is formed or attached on the upper end of the elevator pipe, and this deflector may be made open on its lower or concave side throughout part or all of its length as illustrated, thus forming an inverted concave channel. The two sections of the deflector are hinged together at or near the lower edges, preferably by a hinge on each side composed of two members as 10 and 10ª, the one member having the pivot pin 11 thereon provided with a lug 12 at one side on its free end, and the other member being provided with the bearing aperture 13 having the notch 13ª on one side, adapted to be placed over the end of the pivot pin when the notch registers with the lug, and to rotate on the pivot when the bearing member is located inside the lug on the pin. The lug thus becomes a guard to hold the two parts of the hinged members together.

The bracket 14 is formed or attached on the upper side of one member, preferably the fixed member of the deflector, and the lateral bearings 15 and 15ª and the longitudinal guide 16 are provided in this bracket. The operating shaft 17 is journaled in the lateral bearings of the bracket, and the bevel cog wheel 18 is securely attached on the inner end and the pulley wheel 19 on the outer end of this shaft. The screw threaded adjusting rod 20 is located in the longitudinal guide of the bracket in which it is adapted to freely operate endwise, and the bevel cog wheel 18ª is provided with the screw threaded axial aperture 21, by means of which it is rotatably mounted on the screw threaded rod. The parts are so located and arranged that the bevel cog wheel 18ª meshes—with the bevel cog wheel 18 on one side and bears against the adjoining end of the guide 22 on the other side.

The end of the adjusting rod on the opposite side of the guide from the bevel cog wheel is pivotally connected with the upper side of the other section of the deflector, preferably the hinged member thereof as shown. This connection is conveniently made by means of the bracket 23 in which is journaled the transverse or L-shaped pivot 24 formed on the end of the adjusting rod, the parts being held in position by means of the ordinary key 25. The other end of the rod is provided with the stop 26 which may be in the form of a key, as shown.

The cord or cable 27 is passed over the pulley wheel and hangs downward to a convenient place within reach of the operator; the guard 28 being preferably provided to retain the rope in proper position on the pulley wheel.

It is evident that by these devices the hinged section of the deflector is held in any given position by the abutment of the cog gear wheel on the adjusting rod against the adjoining end of the bracket guide; and that by a rotation of the operating shaft by means of the pulley and rope, the cog gear can be readily operated, and when operated in one direction the rotation of the cog gear wheel on the screw threaded rod will draw or pull the rod endwise in one direction, and when operated in the reverse direction the rod is permitted to move in the other direction; by means of which mechanism the hinged section of the deflector can be readily raised or lowered into any desired position by a proper manipulation by the operator.

The distributing chute 29 is suspended below the free end of the deflector by means of the pendent bar 30 which is connected, preferably detachably, to the end of the deflector, as by means of the hook 31 engaged in the loop 32 and the U-shaped bracket 33 with the retaining key 34. The distributing chute is preferably provided with the slightly flared sides 35 and the upwardly extending rim 36 so that when the silage is discharged upon it from the open end of the deflector it is positively guided downward and off the lower end of the chute at whatever angle and in whatever direction the same is tilted or turned. The slotted aperture 37 is provided in the middle part of the bottom of the chute through which aperture the pendent bar is passed, and by means of this construction and arrangement the chute is adapted to be rotated or tilted in various positions with relation to the pendent bar by the respective chute controlling mechanisms.

The chute rotating mechanism is composed of the bearing bracket 38, the rotating worm 39, the gear wheel 40, the rotating pulley 41 and the rope or cable 42. The bearing bracket is securely attached on the lower end of the pendent bar by its hub 43 and is held against rotation thereon as by means of the cross pin 44 on the bar engaging the notches 45 in the bracket. The bearings 46 are provided on the bracket for the shaft 47 of the worm, and the pulley wheel 41 is securely mounted on this shaft. The guard 49 is preferably provided for the rope or cable, and as shown this guard may depend from the worm shaft by means of the idle hub 50 thereon located outside the pulley wheel and held in position by the key 51 passed through the outer end of the worm shaft.

The gear wheel 40 is formed or attached on the lower end of the chute supporting bracket 52, which bracket is rotatably mounted on the pendent bar and rests on the hub 43 of the bearing bracket. When these parts are assembled the gear wheel meshes with the worm, and it is evident that by operating the pulley wheel one way or another by means of its rope, the chute supporting bracket is rotated one way or the other on the pendent bar by means of the worm gearing thus described.

The chute tilting mechanism is composed of the supporting bracket 53, the tilting worm 54, the gear segment 55, the tilting pulley 56 and the rope or cable 57. The bearings 58 for the shaft 59 of the tilting worm are formed transversely on one side of the supporting bracket, and the tilting pulley is securely mounted on the outer or free end of this shaft. The guard 60 is preferably provided for the tilting pulley cord or cable as shown, and may depend from the idle hub 61 mounted on the tilting worm shaft. The cross head 62 is formed or attached on the upper end of the supporting bracket on which cross head are provided the pivots 63 for the rock bearings 64 and 64$^a$ which are formed or attached on the under side of the chute. The gear segment 55 is formed or attached on the under side of the chute and when the parts are assembled meshes with the worm of the tilting mechanism; and it is evident that when the tilting pulley is operated one way or the other by its rope the chute will be tilted one way or another on its rock bearings by means of the worm gearing forming part of the tilting mechanism.

For use in filling a silo the elevator pipe is first rotated on its axis by means of the bifurcated wrench to bring the discharge end of the deflector in proper position. The discharge end of the deflector is then brought to a proper vertical angle by an adjustment of the hinged section thereof by means of the rope which controls the adjusting mechanism. As the silo is gradually filled the silage is distributed to one side or another and directed to any desired part of the silo by rotating and tilting the distributing chute as may be desired, by a proper manipulation of the ropes controlling the respective rotating and tilting mechanisms.

It is evident that by permitting the several ropes to hang down inside the silo they can be manipulated by an operator standing on the silage which has been deposited, who is thus in position to control the discharge of the silage to any desired place. It is also evident that by reason of my peculiar construction and arrangement, the chute rotating and tilting mechanism and also the operator underneath the same are shielded by the chute from the discharged silage; and also that the ropes by which these mechanisms are operated are likewise protected and do not at any time come in the path of the discharged silage.

When the distributer is suspended from the deflector no provision need be made for preventing the hinged section of the deflector from being elevated by the force of the blast from the blower, because of the weight of the distributer; but when the distributer is detached from the deflector, as when the silo is filled nearly full, such an elevation of the hinged section of the deflector is prevented by providing the hubs 65 and 65ª on the bevel-cog-wheels 18 and 18ª of the deflector adjusting mechanism, and by proportioning the parts so that the end of the latter hub abuts the side of the former hub, which abutment serves to stop the adjusting rod from endwise movement in that direction, excepting the movement caused by the rotation of the gearing.

What I claim as my invention, and desire to secure by Letters Patent, is—

1. In a pneumatic blower, a discharge tube having an annular flange adjacent to its end, an elevator pipe adapted to telescope over the tube and to rest on the flange, loops on the sides of the pipe adapted to engage the hooks of a bifurcated wrench, whereby the pipe can be rotated on the tube.

2. In a hinged deflector for a pneumatic-blower elevator pipe, an adjusting mechanism on one deflector-section comprising a journaled bevel-cog-wheel, a guide, an endwise-movable threaded-rod in the guide and connected with the other deflector-section, a rotatable bevel-cog-wheel having a threaded-axial-aperture on the rod meshing with the other cog-wheel and abutting the guide, there being hubs on the cog-wheels with the end of the threaded-hub abutting the end of the journaled-hub, and means for operating the gearing.

3. In a hinged-deflector for a pneumatic-blower elevator-pipe, an adjusting-mechanism on one deflector-section comprising a transversely-journaled shaft, a bevel-cog-wheel and a pulley fixed on the shaft, a longitudinal-guide, an endwise-movable threaded-rod in the guide and having a transverse pivot on one end and a stop on the other end, a rotatable bevel-cog-wheel having a threaded-axial-aperture on the rod meshing with the other bevel-cog-wheel and abutting the guide, and a bearing on the other deflector section for the transverse pivot on the rod.

4. In a hinged-deflector for a pneumatic-blower elevator-pipe, an adjusting-mechanism on one deflector-section comprising a rotatable shaft, a cog-wheel and a pulley fixed on the shaft, a guide, an endwise-movable threaded-rod in the guide, a rotatable cog-wheel having a threaded-axial-aperture on the rod meshing with the other cog-wheel and abutting the guide, the rod being connected with the other deflector-section at one end and having a stop on the other end.

5. In a hinged-deflector for a pneumatic-blower-pipe, an adjusting-mechanism on one deflector-section comprising a guide, an endwise-movable threaded-rod in the guide, a rotatable-wheel having a threaded-axial-aperture on the rod and abutting the guide, the rod being connected with the other deflector-section at one end and having a stop on the other end, and means for rotating the wheel.

6. In a hinged-deflector for a pneumatic-blower elevator-pipe, an adjusting-mechanism on one deflector-section comprising a guide, an endwise-movable threaded-rod in the guide, a rotatable wheel having a threaded-axial-aperture on the rod and abutting the guide, the rod being connected with the other deflector-section on the opposite side of the guide, and means for rotating the wheel.

7. In a hinged-deflector for a pneumatic-blower elevator pipe, an adjusting-mechanism comprising a guide on one deflector-section, an endwise-movable rod in the guide and connected with the other deflector-section, and a screw-wheel on the rod abutting the guide and adapted to operate the rod endwise.

8. A distributer for the discharge-end of a pneumatic-blower elevator-pipe deflector, comprising a pendent bar on the deflector, a supporting-bracket with a gear-wheel fixed thereon rotatably mounted on the bar, a chute transversely pivoted on the bracket and having an aperture in its bottom through which the pendent bar is passed, a gear-segment on the chute, a worm journaled on the bracket and meshing with the segment, a worm journaled on the bar and meshing with the wheel, and pulleys fixed on the bar and meshing with the wheel, and pulleys fixed on the respective worms.

9. A distributer for the discharge-end of a pneumatic-blower elevator-pipe deflector comprising a pendent bar on the deflector, a supporting-bracket with a gear-wheel fixed thereon rotatably mounted on the bar, a chute transversely pivoted on the bracket and having an aperture in the bottom through which the pendent bar is passed, a gear-segment on the chute, a worm journaled on the bracket and meshing with the segment, a worm journaled on the bar and meshing with the wheel, and means for rotating the respective worms.

10. In a distributer for the discharge end of a pneumatic-blower elevator-pipe-deflector, a pendent-bar on the deflector, a supporting-bracket with a gear-wheel fixed thereon rotatably mounted on the bar, a chute mounted on the bracket and having an aperture in its bottom through which the bar is passed, a worm journaled on the bar and meshing with the wheel, and a pulley fixed on the worm.

11. In a distributer for the discharge end of a pnuematic-blower elevator-pipe-deflector, a pendent-bar on the deflector, a supporting-bracket with a gear-wheel fixed thereon rotatably mounted on the bar, a chute mounted on the bracket and having an aperture in its bottom through which the bar is passed, a worm journaled on the bar and meshing with the wheel, and means for rotating the worm.

12. In a distributer for the discharge-end of a pneumatic-blower elevator-pipe-deflector, a pendent bar on the deflector, a supporting-bracket mounted on the bar, a chute pivoted on the bracket and having an aperture in its bottom through which the bar is passed, a gear-segment on the chute, a worm journaled on the bracket and meshing with the segment and a pulley fixed on the worm.

13. In a distributer for the discharge-end of a pneumatic-blower elevator-pipe-deflector, a pendent bar on the deflector, a supporting-bracket mounted on the bar, a chute pivoted on the bracket and having an aperture in its bottom through which the bar is passed, a gear-segment on the chute, a worm journaled on the bracket and meshing with the segment and means for rotating the worm.

14. A distributer for the discharge-end of a pneumatic-blower elevator-pipe deflector comprising a pendent-bar on the deflector, a bracket rotatably mounted on the bar, a chute transversely pivoted on the bracket and having an aperture in its bottom through which the bar is passed, pulleys journaled on the bar and the bracket, and gearings between the bar-pulley and the bracket, and the bracket-pulley and the chute, respectively.

15. In a distributer for the discharge-end of a pneumatic-blower elevator-pipe deflector, a pendent-bar on the deflector, a bracket rotatably-mounted on the bar, a chute mounted on the bracket and having an aperture in its bottom through which the bar is passed, a pulley journaled on the bar, and a gearing between the pulley and the bracket.

16. In a distributer for the discharge-end of a pneumatic-blower elevator-pipe-deflector, a pendent-bar on the deflector, a bracket mounted on the bar, a chute pivoted on the bracket, a pulley journaled on the bracket, and a gearing between the pulley and the chute.

17. A distributer for the discharge-end of a pneumatic-blower elevator-pipe deflector comprising a pendent bar on the deflector, a bracket on the pendent bar, a chute on the bracket having an aperture in its bottom through which the bar is passed, and means for rotating and tilting the chute.

18. In a distributer for the discharge-end of a pneumatic-blower elevator-pipe, a pendent-bar on the deflector, a bracket on the pendent bar, a chute on the bracket having an aperture in its bottom through which the bar is passed, and means for rotating the chute.

19. In a distributer for the discharge-end of a pneumatic-blower elevator-pipe, a pendent-bar on the deflector, a bracket on the pendent bar, a chute on the bracket having an aperture in its bottom through which the bar is passed, and means for tilting the chute

JOSEPH DICK.

Witnesses:
F. J. DICK,
C. F. DICK.